United States Patent [19]

Ikoma

[11] Patent Number: 5,056,018

[45] Date of Patent: Oct. 8, 1991

[54] PRINTER WITH IMPROVED POWER-FAILURE RESTART FUNCTION

[75] Inventor: Keiichi Ikoma, Nara, Japan

[73] Assignee: Sharp Kabushiki Kaisha, Osaka, Japan

[21] Appl. No.: 423,895

[22] Filed: Oct. 19, 1989

[30] Foreign Application Priority Data

Oct. 27, 1988 [JP] Japan ................................. 63-271696

[51] Int. Cl.$^5$ ....................... G06F 15/21; G07G 1/12
[52] U.S. Cl. .................................................... 364/405
[58] Field of Search ....................................... 364/405

[56] References Cited

U.S. PATENT DOCUMENTS

| 3,834,303 | 9/1974 | Barrus et al. | 101/93.16 |
|---|---|---|---|
| 3,905,294 | 9/1975 | Barrus et al. | 101/93.48 |
| 3,919,936 | 11/1975 | Barrus et al. | 101/93.29 |
| 4,003,030 | 1/1977 | Takagi et al. | 364/405 |
| 4,279,523 | 7/1981 | Ringle | 364/900 |
| 4,290,116 | 9/1981 | Morse | 364/900 |

FOREIGN PATENT DOCUMENTS

| 54-42957 | 4/1979 | Japan . | |
|---|---|---|---|
| 56-117670 | 9/1981 | Japan . | |
| 57-69466 | 4/1982 | Japan | 364/405 |
| 58-46462 | 3/1983 | Japan | 364/405 |
| 58-71979 | 11/1984 | Japan | 364/405 |
| 61-148060 | 7/1986 | Japan . | |

Primary Examiner—Jerry Smith
Assistant Examiner—L. Brutman

[57] ABSTRACT

These is disclosed a printer which continues, after resumptio of power, printing which was in progress before a power failure. In this printer, the disconnection and resumption of power is detected by a detection circuit. When power is once disconnected and then restored, the presence of any character other than blanks which may have been printed by a printing head is detected in a line where the printing head is positioned. If any character other than blanks had been printed on the line where printing operation was interrupted due to disconnection of power, the printing head is controlled to print for crossing out the line after resumption of power. On the other hand, if nothing other than blanks had been printed in the line where the printing operation was interrupted, the printing head is controlled to print the same contents on the line as should have been printed on it without starting another line after resumption of power.

3 Claims, 10 Drawing Sheets

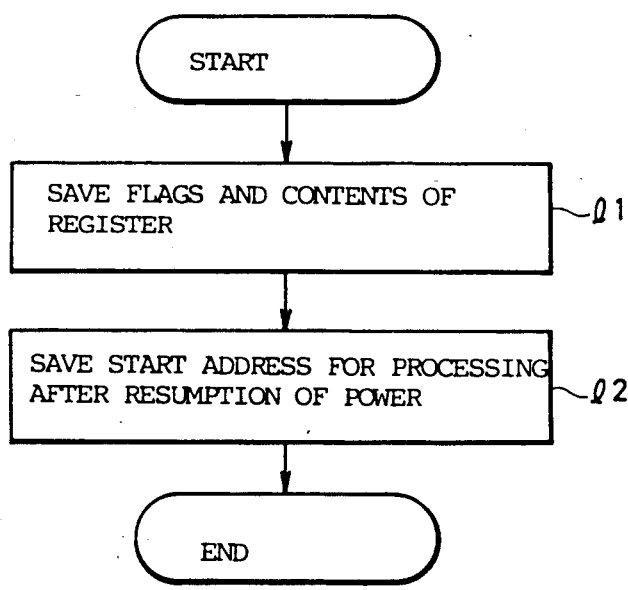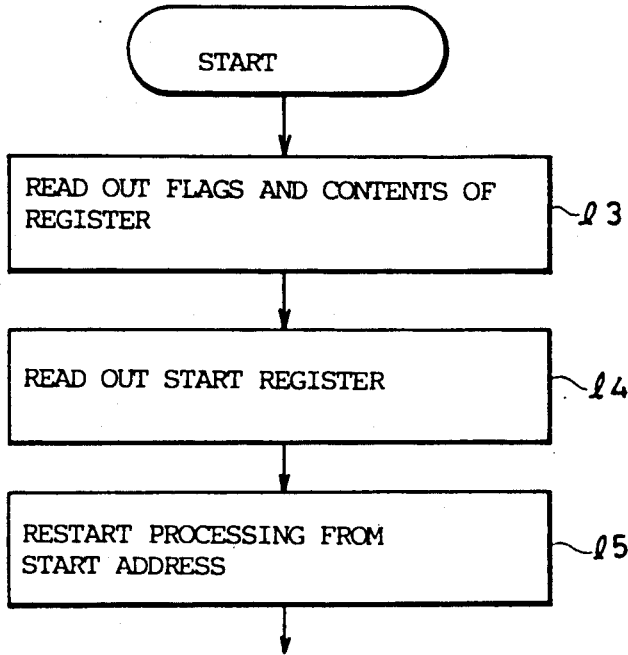

(1)

(2)

ND RESTART FUNCTION

PRINTER WITH IMPROVED POWER-FAILURE RESTART FUNCTION

BACKGROUND OF THE INVENTION

1. Field of the Invention

The present invention generally relates to printers, and more particularly, to a printer with an improved power-failure restart function.

2. Description of the Background Art

A cash register is provided with a printing mechanism for printing a name, department, price and the like of a sold commodity on a receipt sheet. Furthermore, the case that power is disconnected, for example, due to a power failure, the cash register has been adapted to automatically continue the operation which has been once interrupted by the failure, once power is restored. This occurs because the operation state of the cash register has been stored with various flags in a backed-up memory. Upon resumption of power, the cash register is returned to the operation state it was in when the failure occurred by returning such flags to resume the interrupted operation.

Assuming that there is to be provided a printing mechanism capable of subsequently printing characters such as letters or symbols which were being printed when power was disconnected, it is necessary to control a printing head and the like, with high precision so as to precisely replace the printing head to the position it was in when the power failed. Insufficient control precision for the printing head or the like may result in a shear in printing and prevent printing of a regular character. Such high precision control entails, however, not only increased cost but a larger, more complicated apparatus for the cash register.

In the above described cash register, therefore, the processing operation of the printing mechanism is controlled as follows, when the power failure is restored. FIG. 12A is a plan view showing a printed receipt sheet 1. Assuming that the power supply is disconnected due to a power failure when a character 3 is being printed on line 2, then, a flag representing that the mechanism is in process of printing has been raised in the cash register. Thereafter, when the failure is restored with resumption of power, in accordance with the flag, a cross-out printing is performed on the line 2, or horizontal lines "-" are superposed over the entire line 2 as shown in FIG. 12B. Then, the contents of the interrupted line are printed on line 4, which should have been printed on line 2. Subsequently, further operation, including printing on the following lines will be continued.

When the above described cash register is disconnected from the power supply due to a power failure, for example, in printing a blank 6 so as to subsequently print Y1,000 dep. (dep. is abbreviation for deposit) on line 5 close to the right side of a receipt sheet 1 as shown in FIG. 13A, the printing operation will be controlled as follows. That is, on line 5, the contents having been printed before the blank 6 are all blanks so that the printing operation has been interrupted without printing anything on the line 5. However, the resumption of power causes unnecessary cross-out printing to be made on line 5 and in turn the contents which should have been printed on the line 5 are printed on line 7, as shown in FIG. 13B. Therefore, blank characters are unnecessarily crossed out which makes the printed contents less legible, as well as wastes the receipt sheet 1 since blank space has been unnecessarily crossed out by printing on the line 5.

SUMMARY OF THE INVENTION

An object of the present invention is to provide a printer which can make a legible printing even where the printing operation has been once interrupted due to disconnection of power and avoid any waste of recording paper.

According to the present invention, a printing head is moved for every line to print on recording paper. Furthermore, when power is once disconnected due to, for example, a power failure or the like and then restored, detection means detects the failure and resumption of power. Print detection means is responsive to the detection of power resumption for detecting presence of any printed character except blanks in the line where the printing head has been positioned. Control means is responsive to output of the print detection means for controlling the printing operation after resumption of power. More specifically, if any character other than blanks had been already printed in the line where the printing operation was interrupted due to disconnection of power, the printing head is controlled to cross out the line after resumption of power. On the other hand, if nothing had been printed but blanks in the line where the printing operation was interrupted, the printing head is controlled to print the same contents as should have been printed in the very line, without starting another line after resumption of power.

Therefore, in the case where the printing operation is interrupted when substantially nothing has been printed on the recording paper, there is no need to make an unnecessary cross-out printing, which avoids the waste of recording paper and makes the printed contents more legible.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8A and 8B are flow charts for explaining a power-failure restart function.

DESCRIPTION OF THE PREFERRED EMBODIMENTS

Figure 1:
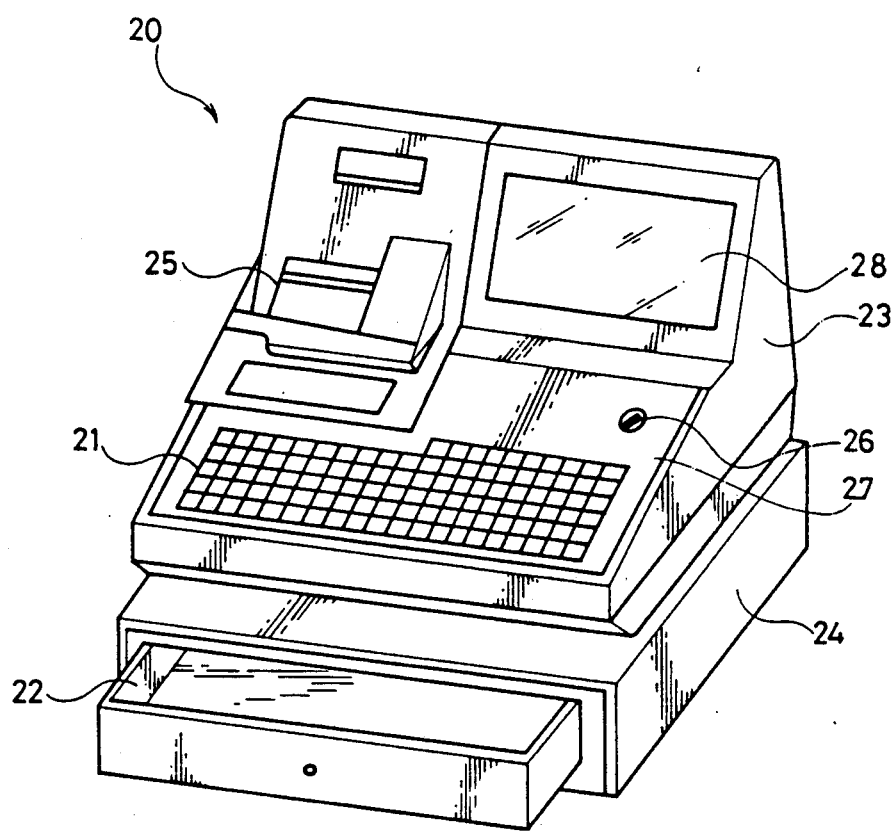
FIG. 1 is a perspective view showing outside of a cash register to which a printer according to an embodiment of the present invention has been applied.

Referring to FIG. 1, a cash register 20 comprises a register body 23 having a key entry portion 27 including a plurality of key switches 21 disposed on its upwardly facing surface, and a cash holding portion 24 holding a cash box 22 in which money and the like are stored. Additionally, in the vicinity of the key entry portion 27, a mode selecting switch 26 is provided for selecting an operation mode of the cash register 20, and a printer 25 and a display portion 28 are disposed in the upper part of the key entry portion 27.

Figure 2:
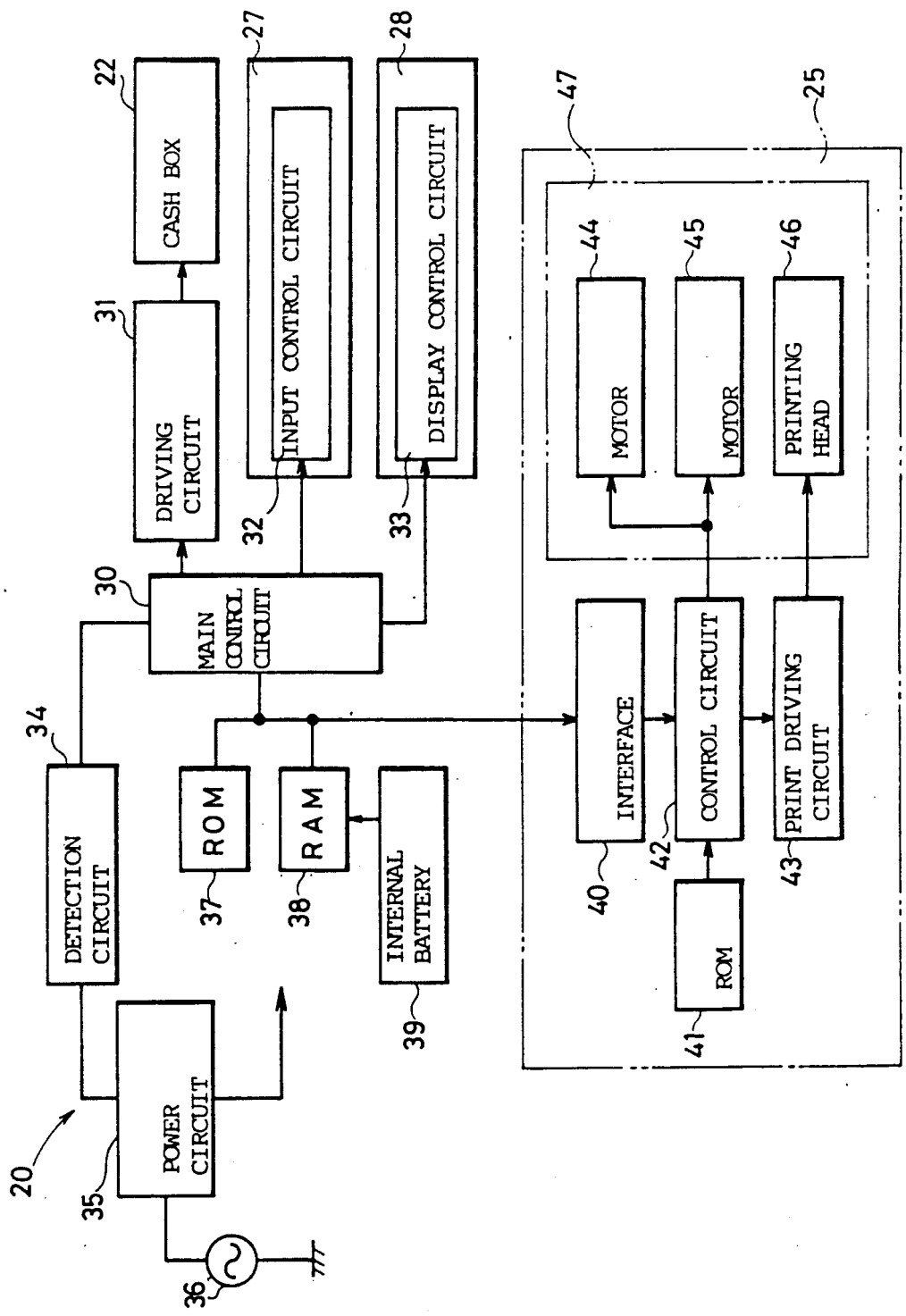
FIG. 2 is a block diagram showing an electrical structure of the cash register.

Referring to FIG. 2, the cash register 20 is powered by means of a commercial AC supply 36. A power circuit 35 is constituted as including a rectification circuit to rectify AC supply from the commercial AC supply 36 and supplies DC power to electrical circuits and the like in the cash register 20. Furthermore, a detection circuit 34 as detection means compares DC voltage from the power circuit 35 with a predetermined voltage level thereby to detect disconnection and resumption of the commercial AC supply 36 due to, for example, a power failure and the like, a detecting signal of which is outputted to a main control circuit 30.

The main control circuit 30 is connected to a printer 25, a read only memory (ROM) 37 in which operation programs and application programs for the main control circuit 30 are stored, a random access memory (RAM) 38 backed-up by an internal battery 39 in which transaction information and a flag F to be described later are stored, a driving circuit 31 for driving a cash box 22 to open and close, an input control circuit 32 in the key entry portion 27, and a display control circuit 33 in the display portion 28. Control means is constituted as comprising the main control circuit 30.

The printer 25 is constituted as comprising a printing mechanism 47 for performing printing operation and a control circuit 42 for controlling the printing operation by the printing mechanism 47. The above mentioned main control circuit 30 is connected to the control circuit 42 through an interface 40. The control circuit 42 is further connected to a ROM 41 in which operation programs for the control circuit 42 and dot images of various kinds of characters are stored, and a print driving circuit 43 for driving a printing head 46.

The printing mechanism 47 is constituted as comprising the printing head 46, a motor 44 for feeding receipt sheets, and another motor 45 for driving the printing head 46, as will be described later. The rotating operations of those motors 44 and 45 are controlled by the control circuit 42.

Figure 3:
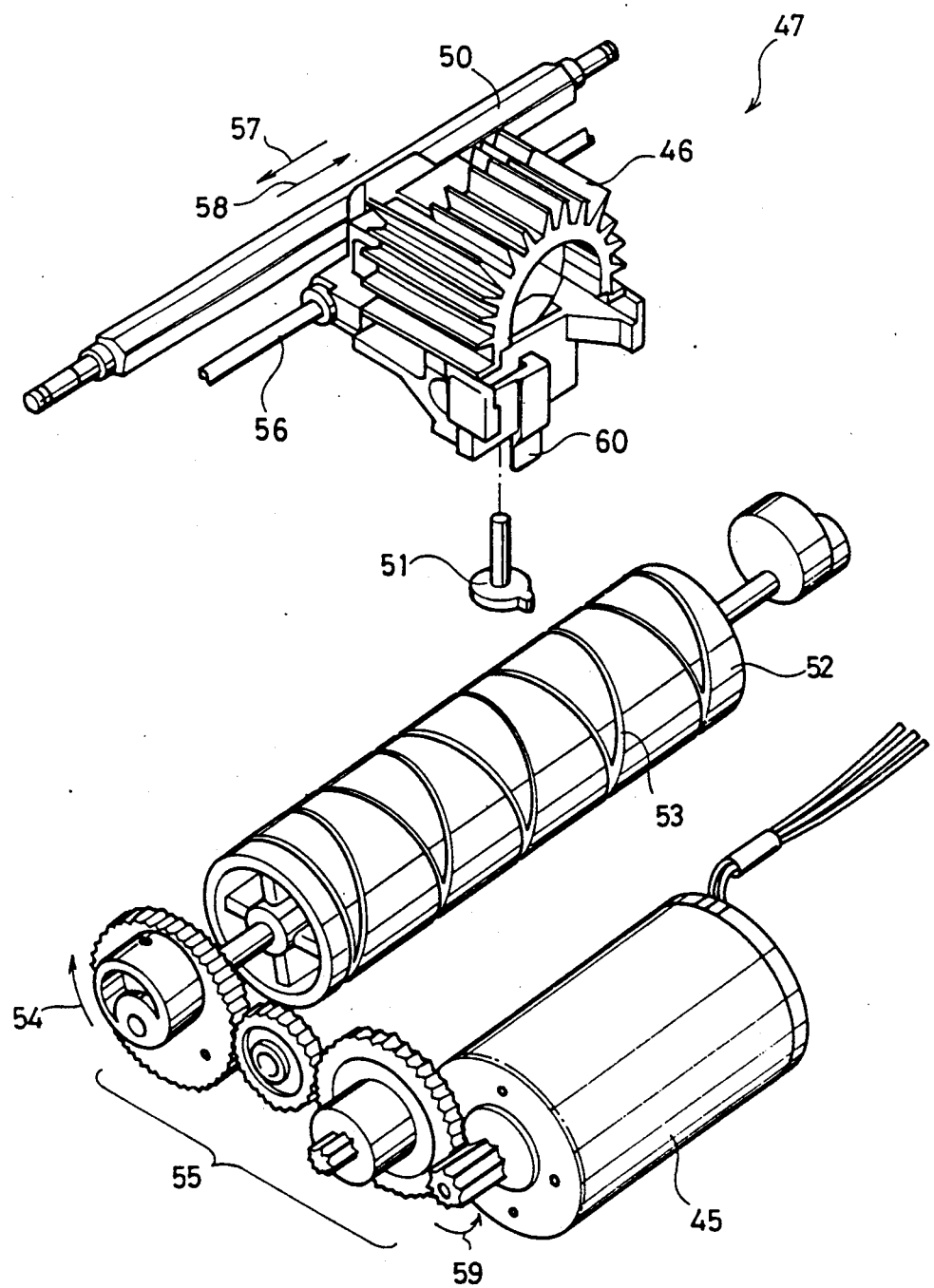
FIG. 3 is an exploded perspective view showing a structure of a printing mechanism of the cash register.

Referring to FIG. 3, the printing mechanism 47 is constituted as comprising the printing head 46, a follower 51, a peripheral cam 52, a platen 50, the motor 45 and the like. In the printing mechanism 47, the printing head 46 has a guide rod 56 extending therethrough and is supported movably in the directions indicated by arrows 57 and 58. The printing mechanism 47 can perform the printing operation during the movement of the printing head 46 whether it is in the direction of arrow 57 or 58.

The motor 45 is responsive to a control signal from the above mentioned control circuit 42 for driving its output shaft to rotate in the direction of arrow 59. The output shaft of the motor 45 is connected to a rotation axis of the peripheral cam 52 through a gear train 55, which enables the peripheral cam 52 to rotate in the direction of arrow 54. A cam groove 53 of the peripheral cam 52, which has been formed to be endless, and the printing head 46 are linked through the follower 51 and this enables the printing head 46 to be driven in the directions of arrows 57 and 58.

Figure 4:
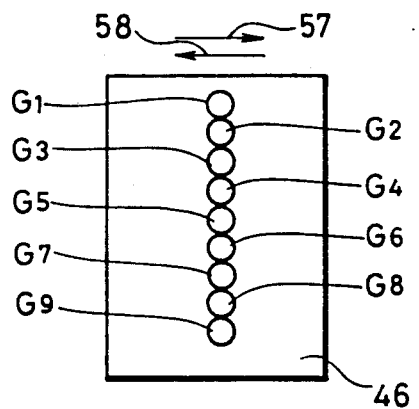
FIG. 4 is a front view showing a simplified printing head of the printing mechanism.

Referring to FIG. 4, the printing head 46 is provided with a plurality of printing means to be described later. These printing means are constituted as comprising wires, as will be described later, tip portions G1 through G9 (generically referred to as "tip portion Gi" hereinafter) of which are disposed along the direction orthogonal with feeding direction of a receipt sheet 11 or with the directions of arrows 57 and 58 as shown in FIG. 4.

Figure 5:
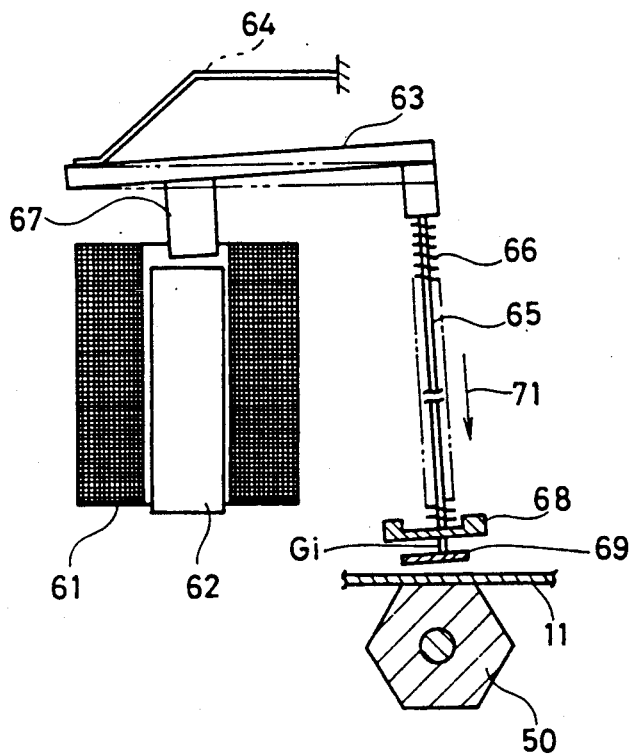
FIG. 5 is a sectional view schematically showing a structure of printing means in the printing head.

Referring to FIG. 5, the printing means provided in the printing head 46 comprise a coil 61, an actuator 63, a wire 65, and a spring 66. One end of the actuator 63 is fixed on one end of a leaf spring 64 bending halfway of its length. The other end of this leaf spring 64 is fixed on housing and the like of the printing head 46 thereby to support the actuator 63. To the other end of the actuator 63 there is connected the wire 65, the tip portion Gi of which is extended toward the receipt sheet 11 through a wire guide 68.

Beneath the actuator 63 there is provided a pole piece 67 to be adjacent to an iron core 62 of the coil 61.

When the coil 61 is energized, the pole piece 67 is attracted to the iron core 62 by magnetic force so that the actuator 63 moves to the position indicated by virtual line. Then, the wire 65 moves in the direction of arrow 71 and its tip portion Gi impresses the recording paper 11 against the platen 50 with an ink ribbon 69 therebetween. This causes ink from the ink ribbon 69 to be transferred onto the recording paper 11 for printing. When the coil 61 is de-energized, the actuator 63 and the wire 65 are returned to their positions as indicated by a solid line by means of the spring 66 which restores the leaf spring 64 and the wire 65.

Figure 6:
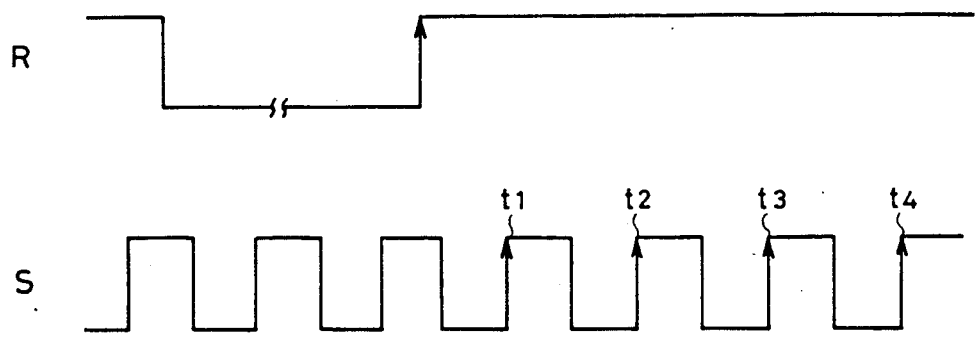
FIG. 6 is a waveform chart of a detecting signal R and a timing signal S.

Now, printing operation of the printer 25 will be described. Referring to FIG. 6, when the printing head 46 is moved into printing region, the detecting signal R from detection means (not shown) rises. The above described coil 61 are energized at times t1 through t4 when the timing signal S rises during the high level period of the detecting signal R thereby printing one dot.

Figure 7:
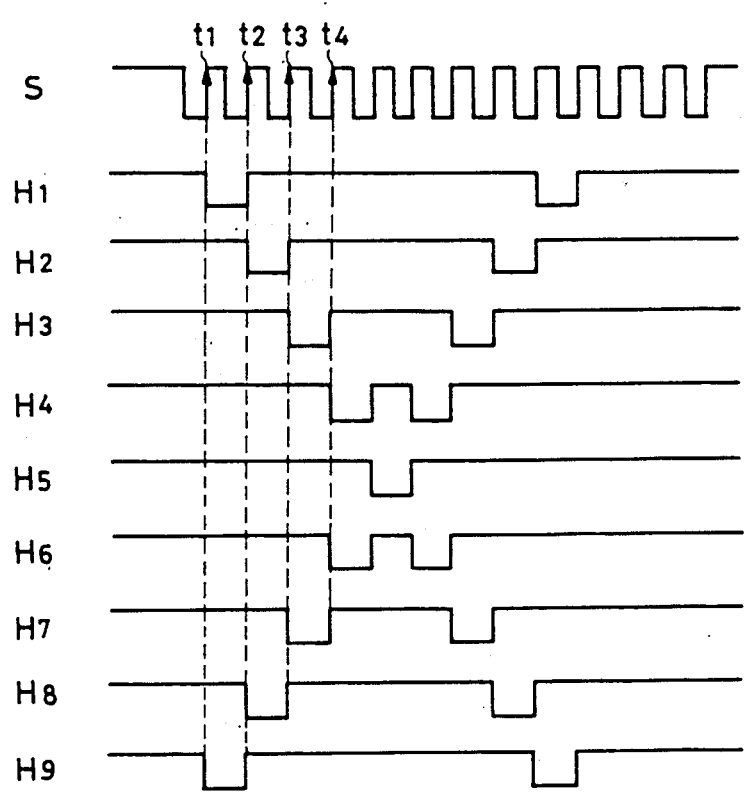
FIG. 7 is a waveform chart of the timing signal S and driving signals H1 to H9 for explaining an example of printing operation for one character in the cash register.

A description will be made in a case where, for example, "x" is to be printed, with reference to FIG. 7. The tip portions G1 through G9 of the wires are all each driven when the driving signals H1 through H9 for driving the coil are at their low level.

After the printing head is driven into the printing region causing the detecting signal R to attain a high level, the coils 61 corresponding to the tip portions G1 and G9 are energized at the time t1 when the time signal S rises, and then the coils 61 corresponding to the tip portions G2 and G8 are energized at the time t2. At the time t3, the coils 61 corresponding to the tip portions G3 and G7 are energized and subsequently the coils 61 corresponding to the tip portions G4 and G6 are energized at the time t4. Such operation is continued to form the character of "x" on the receipt sheet 11 and then printing of another character goes on. When the printing of one line is completed, the receipt sheet 11 is further conveyed to accept another printing operation for the subsequent line.

The cash register 20 comprising such a printing mechanism is generally installed in a front of various shops including supermarkets to process transaction information such as about commodity purchased by customers. For example, transaction information such as department and unit price of a commodity purchased by a customer will be entered in the cash register 20 through depressing operation on the key switches 21. Classification of the sold goods, calculation of total value of the purchase prices or the like are processed based on the transaction information. The transaction information and processed results are displayed in the display portion 28 and printed out by the printer 25 on a receipt sheet as recording paper as well. Such a receipt sheet is a strip of paper which has been wound up around a roll, on which the transaction information and processed results above are printed and issued for the customer.

Furthermore, the cash register 20 is provided with the function which enables it to automatically and continuously restart the once interrupted operation when a failure is restored with resumption of power after power supply disconnection due to the power failure and so forth.

Now, referring to FIGS. 8A and 8B, such a function will be described. When disconnection of power supply is detected by the detection circuit 34, various flags in the main control circuit 30 and the control circuit 42, and the contents of the register will be saved in the RAM 30 backed-up by the internal battery 39 in the step 11. Subsequently in the step 12, a start address representing an address from which processing should be resumed after resumption of power will be saved in the RAM 38. The operations in the steps 11 and 12 are performed during a short time which passes since the detection of power disconnection until the main control circuit 30 and the control circuit 42 go out of operation.

When resumption of power is detected by the detection circuit 34, the flags and the contents of the register stored in the RAM 38 will be read out in the step 13. Subsequently in the step 14, the start address stored in the RAM 38 will be read out.

Then, processing is restarted from the start address in step 15.

Figure 9:
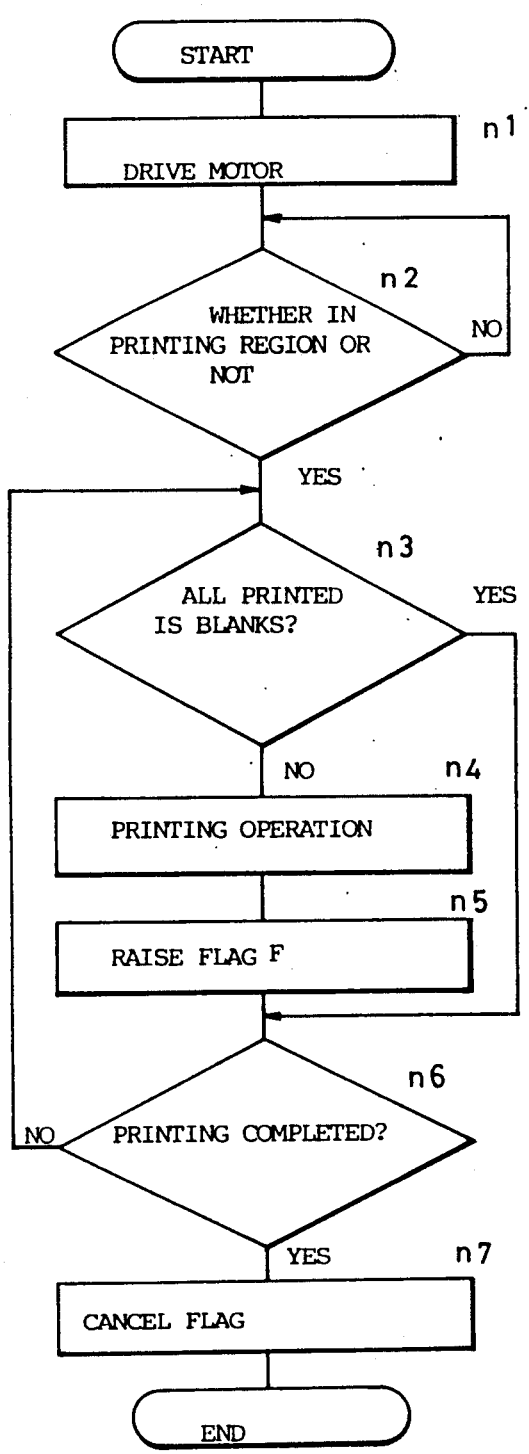
FIG. 9 is a flow chart for explaining a characteristic operation of the cash register in printing.

FIG. 9 is a flow chart for explaining a characteristic operation of the cash register 20 which has such a function. In FIG. 9, there is shown a printing operation for a single line. In beginning the printing operation for a certain line, the printing head 46 is driven by the motor 45 in the step n1. In the step n2, it is determined based on the detecting signal R whether the printing head 46 has been driven into the printing region on the receipt sheet 11 or not. Upon arrival at the printing region on the receipt sheet 11 by the printing head 46, the operation begins step n3.

In step n3, it is determined whether a character to be printed is a blank or not. If it is a blank, the operation shifts to the step n6 to be described later. If it is not a blank, the operation begins step n4 to print the character on the receipt sheet 11 and further proceeds to step n5 to raise a flag F.

In step n6, it is determined whether the printing in the line concerned has been completed or not. If the printing has not been completed yet, the operation returns to step n3 to continue the printing operation for the subsequent character. On the other hand, if completed in the step n6, the operation enters the step n7 to cancel the flag F. After the printing for a single line has been completed in such a manner, the receipt sheet 11 is conveyed only by one line to allow the same processing operation beginning with the step n1 for the subsequent line.

If power supply is disconnected due to, for example, a power failure during such operation, the cash register 20 stores various flags including the flag F in the RAM 38 backed-up by the internal battery 39 thereby to store the operation state.

Accordingly, even if power was disconnected during the printing operation, it is possible to determine whether any character other than blanks had been printed in the line where the printing operation was interrupted, by reference to the flag F.

Figure 10:
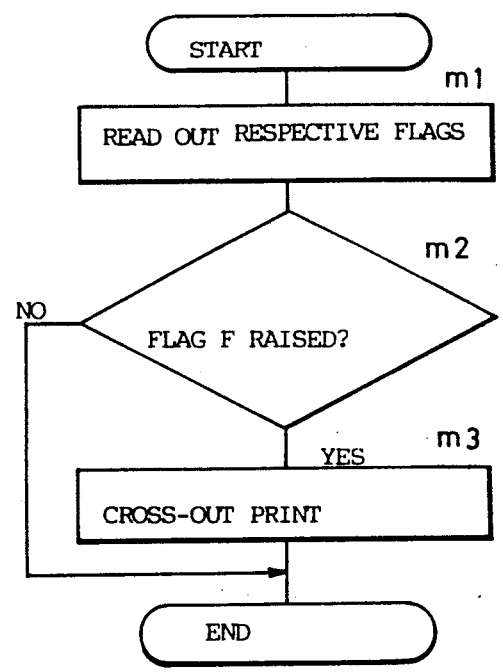
FIG. 10 is a flow chart for explaining operation of the cash register when power is resumed.
Figure 12A:
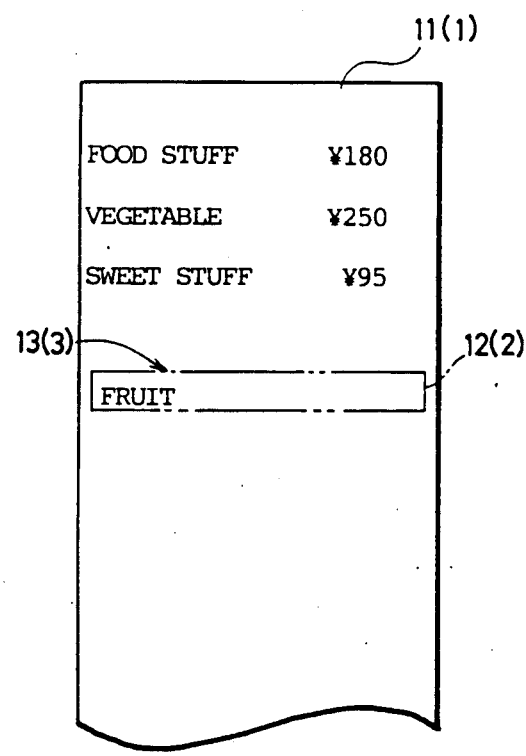
Figure 12B:
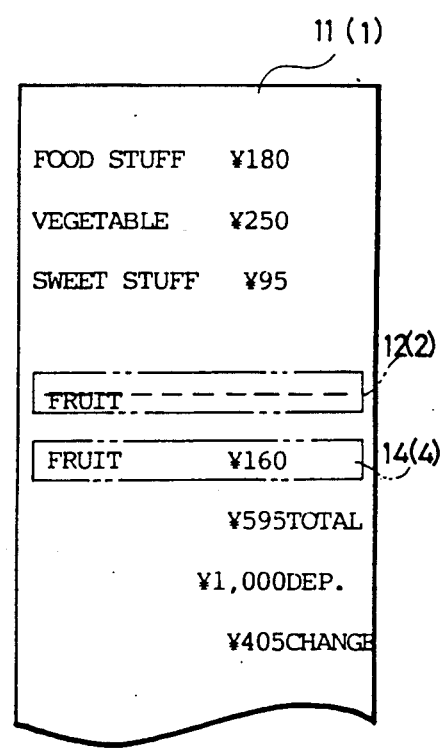
Figure 13A:
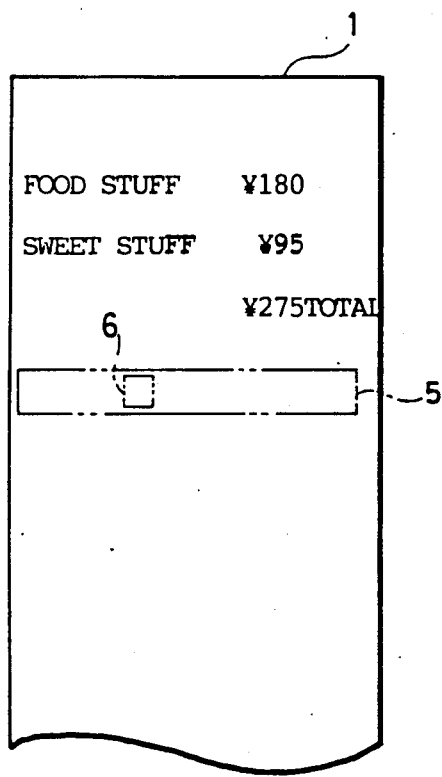
FIG. 13A and 13B are plan views of receipt sheets printed by a conventional cash register.
Figure 13B:
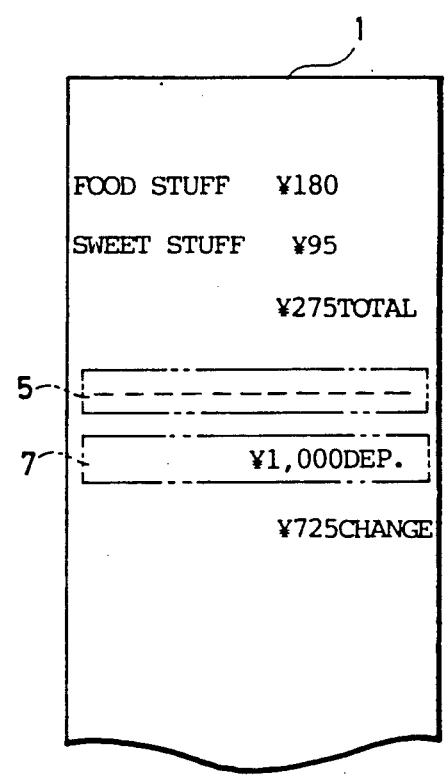

FIG. 10 is a flow chart for explaining operation of the cash register 20 when power is restored. Referring to FIG. 10, when power is restored, various kinds of flags are read out of the RAM 38 backed-up by the internal battery 39 in the step m1. In restarting the printing operation, reference is made to the flag F in step m2. More specifically, for example, in a case where power is disconnected when a character 13 is being printed on line 12 of the receipt sheet 11 as shown in FIG. 12A, the flag F has been raised during the above mentioned printing operation. In such a case, a cross-out printing instruction is outputted in step m3. This causes horizontal lines "-" to be superposed over the full line 12 on the characters having been printed halfway, as shown in FIG. 12B. Thereafter, a new line 14 is started to print the printing contents which should have been printed in the line 12, and the printing operation is continued for the following lines.

Figure 11A:
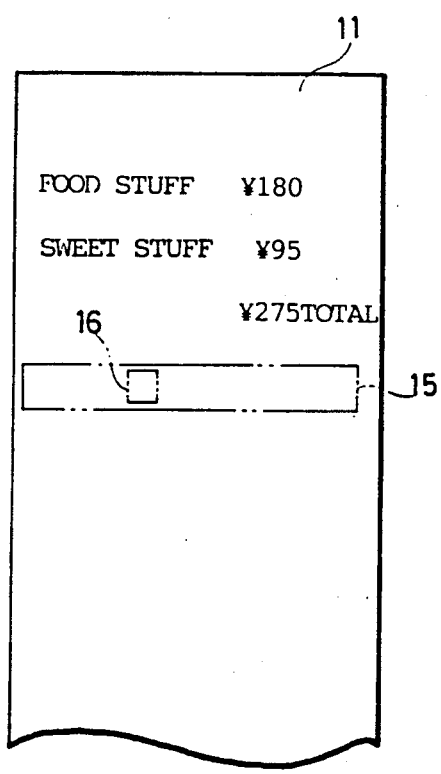
FIGS. 11A to 12B are plan views of receipt sheets printed by the cash register.
Figure 11B:
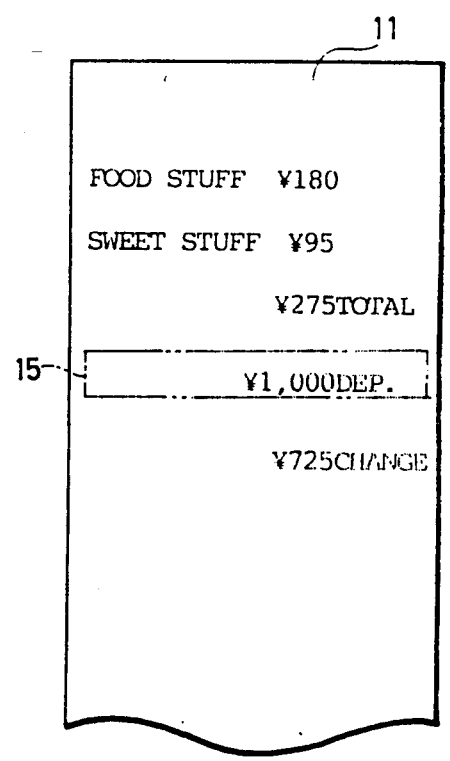

Furthermore, as shown in FIG. 11A, in a case where power is disconnected when a blank 16 is being printed in line 15, the flag F has not been raised during the above mentioned printing operation since nothing other than blanks has been printed in the line 15. In such a case, the step m3 in FIG. 10 is not performed, rather the printing for the line 15 will be repeated from the beginning without starting another line after resumption of power. Subsequently, the printing operation for the following lines will be continued. The printing manner on the receipt sheet 11 in this case is shown in FIG. 11B.

As described in the foregoing, according to the present embodiment of the invention, in the case where substantially nothing had been printed in a line where printing operation was interrupted due to power supply disconnection, it is possible for the cash register to restart the printing in the very line without performing any cross-out printing for the line after resumption of power, by reference to the, flag F. Accordingly, the printed receipt sheet 11 is made more legible and recording paper is not wasted in comparison with the case where the cross-out printing is performed every time power is resumed as described in connection with the prior art.

While the present embodiment of the invention has been described as a printer for the cash register 20, the invention cannot be limited to the cash register application only but generally applicable to any other apparatus comprising a printing mechanism.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printer which continues a print operation interrupted by a power failure, once power is resumed, comprising:
   a power supply;
   a printing head operative with a voltage fed from said power supply for printing line by line on recording paper;
   detection means for comparing the voltage fed from said power supply with a predetermined voltage to detect a power failure and a power resumption;
   print detection means responsive to the detection of the power resumption by said detection means, following the detection of the power failure by said detection means, for detecting a character other a blank which has been printed by said printing head on a line where said printing head is positioned, and to output a detecting signal; and
   control means responsive to the detecting signal from said print detection means for controlling said printing head to cross out the line after the power resumption if any character other than blanks had been printed by said printing head on the line where printing was interrupted by the power failure, and to print the same contents on the line after the power resumption, as should have been printed if nothing other than blanks has been printed, before the power failure.

2. A transaction processing apparatus, including a printer, said printer comprising:
   a power supply;
   a printing head operative with a voltage fed from said power supply for printing line by line on recording paper;
   detection means for comparing the voltage fed from said power supply with a predetermined voltage to detect a power failure and a power resumption;
   print detection means responsive to the detection of the power resumption by said detection means, following the detection of the power failure by said detection means, for detecting a character other a blank which has been printed by said printing head on a line where said printing head is positioned, and to output a detecting signal; and
   control means responsive to the detecting signal from said print detection means for controlling said printing head to cross out the line after the power resumption if any character other than blanks had been printed by said printing head on the line where printing was interrupted by the power failure, and to print the same contents on the line after the power resumption, as should have been printed if nothing other than blanks has been printed, before the power failure.

3. The transaction processing apparatus of claim 2, wherein said transaction processing apparatus is a cash register.

* * * * *